US010086761B2

(12) United States Patent
Kröll et al.

(10) Patent No.: US 10,086,761 B2
(45) Date of Patent: Oct. 2, 2018

(54) AUTOMOTIVE CONSTRUCTION MACHINE AND METHOD FOR DISPLAYING THE SURROUNDINGS OF AN AUTOMOTIVE CONSTRUCTION MACHINE

(71) Applicant: Wirtgen GmbH, Windhagen (DE)

(72) Inventors: Harald Kröll, Unkel (DE); Herbert Lange, Overath (DE); Martin Lenz, Grossmaischeid (DE)

(73) Assignee: Wirtgen GmbH (DE)

( * ) Notice: Subject to any disclaimer, the term of this patent is extended or adjusted under 35 U.S.C. 154(b) by 114 days.

(21) Appl. No.: 15/219,620

(22) Filed: Jul. 26, 2016

(65) Prior Publication Data
US 2017/0036602 A1 Feb. 9, 2017

(30) Foreign Application Priority Data

Aug. 5, 2015 (DE) ........................ 10 2015 010 011

(51) Int. Cl.
*B60R 1/00* (2006.01)
*E02F 3/18* (2006.01)
(Continued)

(52) U.S. Cl.
CPC .............. *B60R 1/00* (2013.01); *E01C 23/088* (2013.01); *E02F 3/181* (2013.01); *E02F 3/183* (2013.01);
(Continued)

(58) Field of Classification Search
None
See application file for complete search history.

(56) References Cited

U.S. PATENT DOCUMENTS 8,590,983 B2 11/2013 Berning et al.
9,181,664 B2 11/2015 Berning et al.
(Continued)

FOREIGN PATENT DOCUMENTS

DE 102006003538 B3 7/2007
DE 202007005756 U1 8/2008
(Continued)

OTHER PUBLICATIONS

German Patent and Trademark Office, First Office Action in corresponding German Patent Application No. DE102015010009.2 dated Jun. 22, 2016, 6 pp.
(Continued)

*Primary Examiner* — Eileen M Davis
(74) *Attorney, Agent, or Firm* — Lucian Wayne Beavers; Gary L. Montle; Patterson Intellectual Property Law, PC

(57) ABSTRACT

The invention relates to an automotive construction machine with a transport device extending in the working direction beyond the machine frame, in particular a road milling machine or surface miner. Moreover, the invention relates to a method for displaying an image of the surroundings of an automotive construction machine. The construction machine according to the invention has an image display device for displaying a bird's eye view image of the surroundings of the construction machine, which image display device has a camera system with a plurality of cameras for recording individual overlapping image regions of the construction machine surroundings from different image recording positions, and an image processing system. The image processing system is configured in such a way that image details of the individual image regions are joined together to form a total image from a bird's eye view. The camera system has at least one camera which is arranged on the transport device in such a way that the viewing direction of the camera is
(Continued)

directed in the direction of the machine frame, and at least one further camera which is arranged on the machine frame in such a way that the viewing direction of the camera is directed away from the machine frame. Using the cameras directed into and away from the machine frame, the machine operator obtains a complete surround view, which includes the region covered by the transport device in the working direction in front of the construction machine.

20 Claims, 8 Drawing Sheets

(51) Int. Cl.
  *E02F 3/20*  (2006.01)
  *E01C 23/088*  (2006.01)
  *E02F 5/08*  (2006.01)
  *E02F 9/24*  (2006.01)
  *E02F 9/26*  (2006.01)
  *G06K 9/00*  (2006.01)
  *H04N 5/265*  (2006.01)
  *H04N 7/18*  (2006.01)

(52) U.S. Cl.
  CPC .............. *E02F 3/188* (2013.01); *E02F 3/20* (2013.01); *E02F 5/08* (2013.01); *E02F 9/24* (2013.01); *E02F 9/261* (2013.01); *G06K 9/00791* (2013.01); *H04N 5/265* (2013.01); *H04N 7/181* (2013.01); *B60R 2300/105* (2013.01); *B60R 2300/303* (2013.01); *B60R 2300/607* (2013.01); *B60R 2300/802* (2013.01)

(56) References Cited

U.S. PATENT DOCUMENTS

| | | | |
|---|---|---|---|
| 2008/0143835 A1 | 6/2008 | Abe et al. | |
| 2008/0309784 A1* | 12/2008 | Asari | ................ B60R 1/00 |
| | | | 348/222.1 |
| 2009/0022423 A1 | 1/2009 | Ehlgen et al. | |
| 2012/0127310 A1 | 5/2012 | Kim | |
| 2014/0267731 A1* | 9/2014 | Izumikawa | ............... B60R 1/00 |
| | | | 348/148 |
| 2014/0354813 A1* | 12/2014 | Ishimoto | ................ H04N 7/181 |
| | | | 348/148 |
| 2015/0009329 A1 | 1/2015 | Ishimoto | |
| 2015/0070498 A1 | 3/2015 | Kriel | |
| 2015/0368881 A1 | 12/2015 | Baeumchen | |

FOREIGN PATENT DOCUMENTS

| | | |
|---|---|---|
| DE | 102011077143 A1 | 12/2012 |
| DE | 102011088332 A1 | 6/2013 |
| DE | 102013006464 A1 | 10/2013 |
| DE | 102013002079 A1 | 8/2014 |
| DE | 102014013155 A1 | 3/2015 |
| JP | 2010241548 A | 10/2010 |
| JP | 2013253402 A | 12/2013 |

OTHER PUBLICATIONS

European Search Report in corresponding European Patent Application No. EP 16180895.1, dated Jan. 19, 2017, 8 pp.
European Search Report in European Patent Application No. EP 16180881.1 corresponding to co-pending U.S. Appl. No. 15/219,597, dated Jan. 23, 2017, 7 pp.
Co-pending U.S. Appl. No. 15/219,597, filed Jul. 26, 2016 to Kroll et al.

* cited by examiner

AUTOMOTIVE CONSTRUCTION MACHINE AND METHOD FOR DISPLAYING THE SURROUNDINGS OF AN AUTOMOTIVE CONSTRUCTION MACHINE

BACKGROUND OF THE INVENTION

1. Field of the Invention

The invention relates to an automotive construction machine with a transport device extending beyond the machine frame in the working direction, in particular a road milling machine or surface miner, which has an image display device for displaying an image of the surroundings of the construction machine. Moreover, the invention relates to a method for displaying an image of the surroundings of an automotive construction machine.

2. Description of the Prior Art

The known construction machines have a machine frame, which is carried by a chassis that has front and rear running gears, and a working device arranged on the machine frame for removing the ground, for example for removing defective road layers (road milling machine), or mining mineral resources (surface miner). The working device may have a milling and/or cutting roller. Lifting devices, which can in each case be retracted or extended, are associated with the individual running gears of the construction machine so that the machine frame can be lowered or raised together with the working device in relation to the ground surface, or the incline to the ground surface can be changed. The removed material is conveyed using a transport device to a transport vehicle that travels ahead of the construction machine or follows it. The transport device has a jib extending beyond the machine frame, which jib is pivotably arranged on the machine frame about an axis running perpendicular to the plane of the machine frame. The jib can also be pivoted about an axis running parallel to the plane of the machine frame and transverse to the longitudinal axis of the construction machine. Consequently, the jib can be pivoted to the two sides and also adjusted with respect to height. The jib extends in the working direction a long way forward beyond the machine frame in the case of front loader construction machines and rearward in the case of rear loader construction machines.

The operator of the machine is confronted with the problem that the surroundings of the construction machine can only be seen to a limited extent from the control stand. There is the added difficulty in the case of front loader and rear loader construction machines that the machine operator's view is limited to the front or rear by the transport device which protrudes a long way. Consequently, the operator of a road milling machine cannot see from the control stand objects that are concealed by the transport device in his field of vision. Depending on the position of the driver on the control stand extending over the entire width of the machine and the large pivoting range of the transport device, not only may objects located directly below the transport device be concealed, but also those next to or in front of and behind the transport device.

Because of the limited view, construction machines are known that are equipped with one or more cameras. Known road milling machines have, for example, a camera which records an image of a rearward region of the construction machine, which is displayed on a display unit arranged on the control stand. This makes it easier for the machine operator to reverse the construction machine.

DE 10 2013 002 079 A1 (US 2015/368881) describes a digger, which has a plurality of monitoring cameras, which are arranged on different sides of the machine frame at different heights above the ground surface. The individual cameras, which may be displaceably or rotatably mounted on the machine frame for adjustment, record partial images of the surroundings, said images being joined together by means of an image processing system to form a total image of a specific region of the surroundings.

Devices which assist the driver when parking the vehicle are known for motor vehicles, in particular passenger vehicles. Devices of this type are also called driver assistance systems and supply the driver of the motor vehicle with a complete image of the vehicle surroundings from a virtual point of view which is located above the vehicle. A surround view of this type of the surroundings is also called a bird's eye view.

DE 10 2011 077 143 A1 describes a driver assistance system for motor vehicles, which has a front camera in the radiator grille, a side camera in each of the two outside mirrors and a rear camera on the vehicle rear in the region of the grip recess of the boot lid. The front camera records a front image region and the rear camera records a rear image region, while the side cameras record lateral image regions, which are transformed using a suitable imaging model into a total image composed of four image details. Complete coverage of the entire vehicle surroundings is to be achieved in that the cameras are equipped with an optical system allowing a horizontal opening angle of more than 180° (fish-eye optical system), so that the individual image regions overlap one another.

DE 10 2011 088 332 A1 describes a method for improving object detection in multi-camera systems for motor vehicles. The document deals with the problem of detecting raised objects in critical regions of a total image from a bird's eye view. The method provides the recording of a front and rear and two lateral viewing regions, which are joined together to form a total image from a bird's eye view. The critical regions for the object detection are to be located in the region of the stitching. While in current systems a rigidly implemented and non-changeable stitching is defined within the overlapping region of the images, the known method provides a displacement of the stitching in such a way that the stitching is not located in the region of raised objects. This is to avoid objects being located in the region of the stitching which is critical for object detection.

A method for joining together a plurality of image recordings to form a total image from a bird's eye view is also known from DE 10 2006 003 538 B3. Apart from use in passenger vehicles, the known method is also suitable for use in lorries, omnibuses or construction vehicles.

DE 2014 013 155 A1 describes an image display system for movable working machines such as lorries for transporting earth, wheel bearings or diggers, which allows objects located in the limited field of vision of the vehicle driver to be seen. The image display system also provides a bird's eye view. The type of view depends on a specific state of the working machine, which is detected by sensors. In a preferred embodiment, the movement direction and speed of the working machine are detected as the state of the working machine in order to be able to monitor the spatial relationship between machine and object. For example, an object is not to be indicated if it is located outside the movement region of the machine.

Although occasional references in the documentary prior art can be found to the use of the known driver assistance systems even in construction machines, the known driver assistance systems preferably intended for passenger vehicles or lorries are generally not suitable for the particular requirements, which automotive construction machines with a transport device extending a long way forward, in particular a road milling machine or surface miner, demand of driver assistance systems, as these construction machines and motor vehicles fundamentally differ from one another in that a motor vehicle has neither a working device to remove ground material nor a transport device.

The known solutions for driver assistance systems for displaying a bird's eye view image of the surroundings of a vehicle exclusively use cameras with a viewing direction which is directed away from the vehicle, or cameras with viewing directions which are directed away from one another, i.e. the systems do not provide any cameras that face one another. Thus the opinion has become established that the extensions of the axes of all the cameras counter to the viewing direction are to meet in a common centre. The experts were of the opinion that it was not the machine frame, but the surroundings of the vehicle which were to be detected to allow a complete surround view. Therefore, cameras that point away from the vehicle or from a common centre are provided in all vehicles. This also applies to cameras which are mounted on the attachments of the vehicle, for example on the rear view mirrors of a motor vehicle.

SUMMARY OF THE INVENTION

The object of the invention is to provide an automotive construction machine with a transport device extending in the longitudinal direction of the construction machine forward or rearward beyond the machine frame to convey removed material, in particular a road milling machine or surface miner, which provides the machine operator with a high degree of operating convenience. A further object of the invention is to specify a method for improving the operating convenience.

These objects are achieved by the features of the independent claims. The dependent claims relate to advantageous embodiments of the invention.

The construction machine according to the invention has an image display device for displaying a bird's eye view image of the surroundings of the construction machine, which image display device has a camera system with a plurality of cameras for recording individual overlapping image regions of the construction machine surroundings from different image recording positions, and an image processing system. The image processing system is configured in such a way that image details of the individual image regions are joined together to form a total image from a bird's eye view.

The camera system has at least one camera, which is arranged on the transport device in such a way that the viewing direction of the camera is directed substantially in the direction of the machine frame, and at least one further camera, which is arranged on the machine frame in such a way that the viewing direction of the camera is substantially directed away from the machine frame. A camera, which is substantially directed in the direction of the machine frame, is thus taken to mean a camera with a viewing direction which points to the machine frame, while a camera which is substantially directed away from the machine frame is taken to mean a camera with a viewing direction which does not point to the machine frame.

The viewing direction, which is directed in the direction of the machine frame, of the at least one camera arranged on the transport device allows an image of the entire front region of the construction machine to be displayed, which, because of the covering by the transport device, would not be possible with a camera arranged on the machine frame, which is directed away from the machine frame. Using the cameras directed in the direction of the machine frame and directed away from the machine frame, the machine operator obtains a complete surround view, which includes the region covered by the transport device in the working direction in front of or behind the construction machine.

In contrast to the known systems, the invention provides at least one camera with a viewing direction which is not directed away from the machine frame, but is directed towards the machine frame. Therefore, the invention treads a new path in the solution of the problem of a limited view in construction machines.

In a preferred embodiment, the at least one camera is arranged on the transport device in such a way that a part of the image region recorded by the at least one camera is located below the machine frame. Consequently, the at least one camera with the rearward viewing direction does not only allow a surround view comprising the portion in front of the machine frame but also one comprising the portion below the machine frame. In the case of a front loader construction machine, the portion is located below the machine frame, preferably in the region of at least one front running gear of the construction machine, so the machine operator can also see how the running gear is moving towards an object located directly in front of the running gear. In the case of a rear loader construction machine, analogous conditions are produced.

The transport device preferably has a jib, on which a conveyor belt is arranged, the at least one camera arranged on the transport device being arranged on the lower side of the jib. The at least one camera can basically be arranged on a fastening point over the entire length of the jib. However, the camera should be located above the ground but not located above the loading area of the transport vehicle during the loading process of the construction machine. The at least one camera may be arranged at different viewing angles in relation to the machine frame and therefore in relation to the ground surface. It is advantageous if the camera is as far removed a possible from the front side of the construction machine so that the image region recorded by the camera is as large as possible. In this case, it is also advantageous for the height of the camera to increase in relation to the ground surface with the increasing distance of the camera from the front side of the construction machine, as the transport device is inclined upwardly in the working direction.

One embodiment provides that the camera system has a camera arranged on the lower side of the jib of the transport device, the camera axis running in the longitudinal direction of the jib, while an alternative embodiment provides two cameras arranged on the lower side of the jib, the camera axes of which run in a sloping manner with respect to the longitudinal direction of the jib. In this case, the viewing direction of the one camera is directed in the direction of the one side of the machine frame and the viewing direction of the other camera is directed in the direction of the other side of the machine frame when the jib is not pivoted to the one or other side. The embodiment with two cameras has the advantage that the cameras can have a smaller viewing angle (focal length) in order to be able to record the same image region, or a larger image region can be recorded using the same viewing angle (focal width).

It is generally sufficient for a complete surround view if the camera system, to record a left-hand and right-hand image region, has a left-hand camera on the left-hand longitudinal side of the machine frame in the working direction and a right-hand camera on the right-hand longitudinal side of the machine frame in the working direction, and has a rear camera in the working direction to record a rear image region. However, a plurality of cameras may also be provided on the longitudinal sides and/or the rear side of the construction machine.

In a particularly preferred embodiment, the left-hand camera and the right-hand camera and the at least one camera arranged on the transport device are arranged on the machine frame and the transport device in such a way that the image region of the right-hand camera and the image region of the left-hand camera overlap with the at least one image region of the at least one camera arranged on the transport device in a region on the left-hand and right-hand longitudinal side of the machine frame. The image regions of the left-hand and right-hand camera preferably also overlap with the image region of the rear camera.

The image processing system is preferably configured in such a way that in the image region of the left-hand camera, the image region of the right-hand camera and the image region of the at least one camera arranged on the transport device, image details are determined, which are joined together to form a total image in a bird's eye view, which comprises a portion located on the left-hand and right-hand longitudinal side of the machine frame, a portion located below the machine frame and a portion located in front of the machine frame. Therefore, a complete surround view is provided for the machine operator.

To orientate the transport device to the loading area of the transport vehicle, the transport device of a construction machine is pivotably arranged on the machine frame, generally about an axis running perpendicular to the plane of the machine frame. When the transport device is pivoted to the one side or the other, the image region recorded by the at least one camera arranged on the transport device changes.

Another particularly preferred embodiment therefore has a position detection device detecting the pivoting position of the transport device, the image processing system being configured in such a way that the course of the stitching between the image details is determined depending on the pivoting position of the transport device.

Determining the course of the stitching depending on the pivoting position of the transport device allows the individual images to be joined together relatively easily with a comparatively low computational complexity, so the image data required to display the total image can be generated in real time The position detection device is preferably configured in such a way that position data describing the pivoting position are produced. In this case, it is unimportant how the position data are determined. The pivoting position may for example be detected with angle transmitters, distance sensors or the like.

When there is a pivoting movement of the transport device, the image region detected by the camera changes, in which case the contour of the image region is displaced. Different overlapping regions are produced depending on the pivoting position of the transport device. The spatial position and extent of the overlapping regions determine the dimensions of the image details to be selected that are joined together to form a total image from a bird's eye view. As a result, the course of the stitching between the image details is also determined.

The image processing system is preferably configured in such a way that the course of the stitching between the image details is determined based on the position data in such a way that the stitching is located within the overlapping regions of the left-hand and right-hand image region with the front image region and within the overlapping regions of the left-hand and right-hand image region with the rear image region. As a result objects in the region of the stitching, which are possibly reproduced double or not at all due to imaging errors, can be better detected.

In this context, the course of the stitching is taken to mean the spatial arrangement of the stitching, i.e. the line along which the stitching runs. The course of the stitching can be determined using the known algorithms which calculate a displacement of the stitching line depending on the pivoting position of the transport device.

The transport device is generally also pivotably arranged on the machine frame about an axis running parallel to the plane of the machine frame and transverse to the longitudinal axis of the construction machine. As a result, the transport device can also be height-adjusted. With a height adjustment of the transport device, the viewing angle of the at least one camera on the transport device is also changed, whereby the contour of the recorded image region is displaced. The position detection device may be configured in such a way that position data describing not only the pivoting position, but also the setting angle of the transport device in relation to the plane of the machine frame are produced, the image processing system being configured in such a way that the course of the stitching between the image details is also determined depending on the setting angle of the transport device.

A sloping position of the camera axes with respect to the ground surface inevitably leads to distortions during the viewing of the camera image in the rectangular image plane. These distortions may, however, be at least partially compensated using the known methods for image processing.

BRIEF DESCRIPTION OF THE DRAWINGS

Embodiments of the invention will be described in detail below with reference to the drawings, in which.

DETAILED DESCRIPTION

Figure 1:
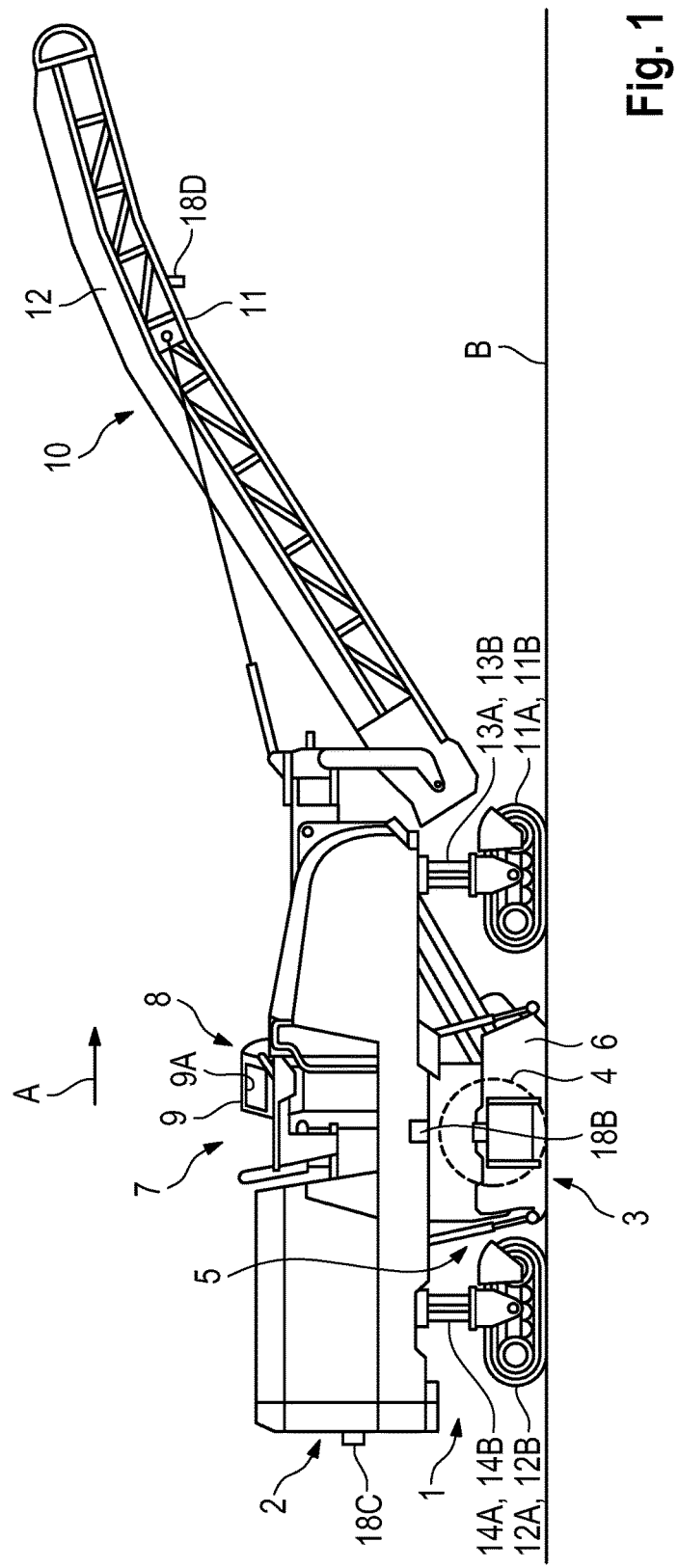
FIG. 1 is a side view of an embodiment of an automotive construction machine.
Figure 2:
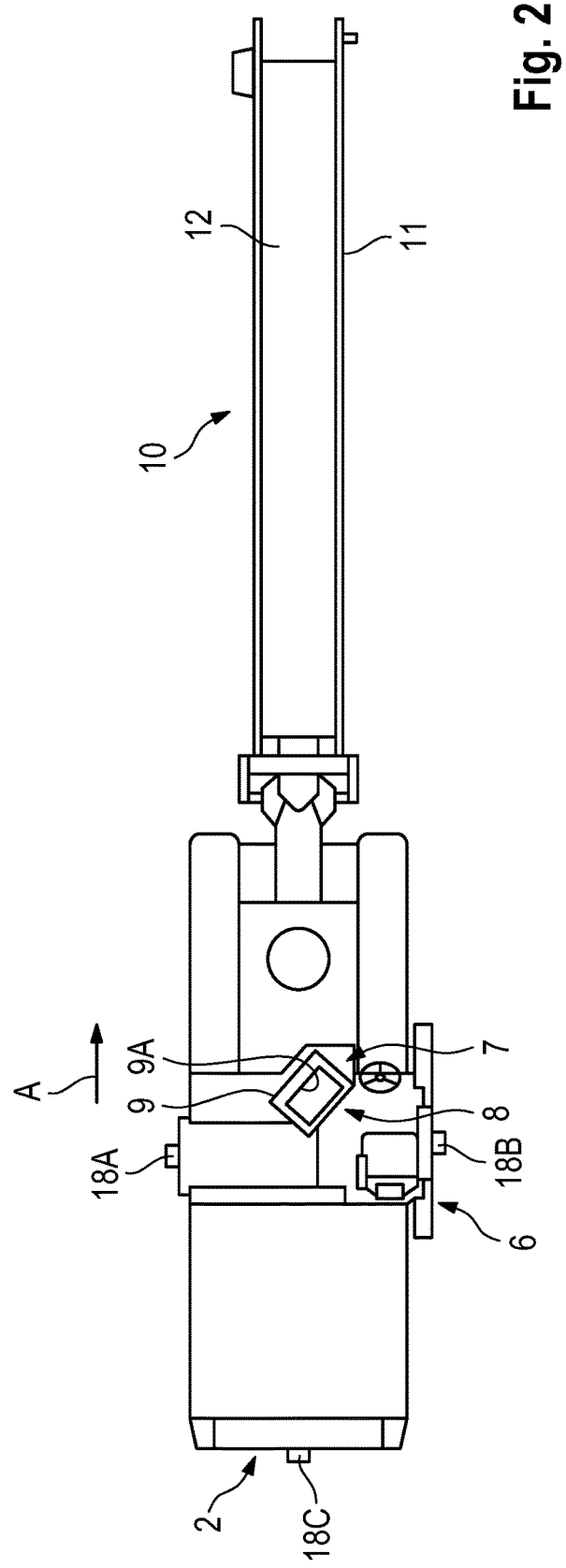
FIG. 2 is a plan view of the construction machine of FIG. 1.

As an example of an automotive construction machine, FIGS. 1 and 2 show, in a side and plan view, a road milling machine for milling road surfaces, this being a front loader road milling machine. The road milling machine may, however, also be a rear loader road milling machine.

The construction machine has a machine frame 2 carried by a chassis 1, on which a working device 3 is arranged. The working device 3 has a working roller, this being a milling roller. The milling roller 4, only indicated in FIG. 1, is arranged in a milling roller housing 5. On the left-hand and right-hand side in the working direction A, the milling roller housing 5 is closed by an edge protector 6. The milling roller housing 5 is closed by a hold-down device on the front side in the working direction A, and by a stripper device on the rear side, which devices cannot be seen in FIG. 1. The control stand 7 with a control panel 8 for the machine operator is located on the machine frame above the milling roller housing 5. A display unit 9 with a display 9A is located on the control panel 8. The milled-off milling product is removed using a transport device 10 extending in the working direction A a long way forward beyond the machine frame 2. The transport device 10 has an elongate jib 11, which is pivotably fastened on the two sides on the machine frame 2 in the working direction in front of the control stand 7 about an axis running perpendicular to the plane of the machine frame. Moreover, the jib 11 is pivotable about an axis running parallel to the plane of the machine frame 2, so the jib can be moved up and down. A conveyor belt 12 for conveying the milled-off material is located on the upper side of the transport device 10.

The construction machine has, in the working direction A, a front left-hand running gear 11A and a front right-hand running gear 11B and a rear left-hand running gear 12A and a rear right-hand running gear 12B, with which are associated a front left-hand and right-hand lifting device 13A,B in the working direction A and a rear left-hand and right-hand lifting device 14A,B, so that by retracting and extending the lifting devices, the height and incline of the machine frame 2 in relation to the ground surface B can be changed. The running gears of the construction machine can be both crawler tracks and wheels.

Figure 3:
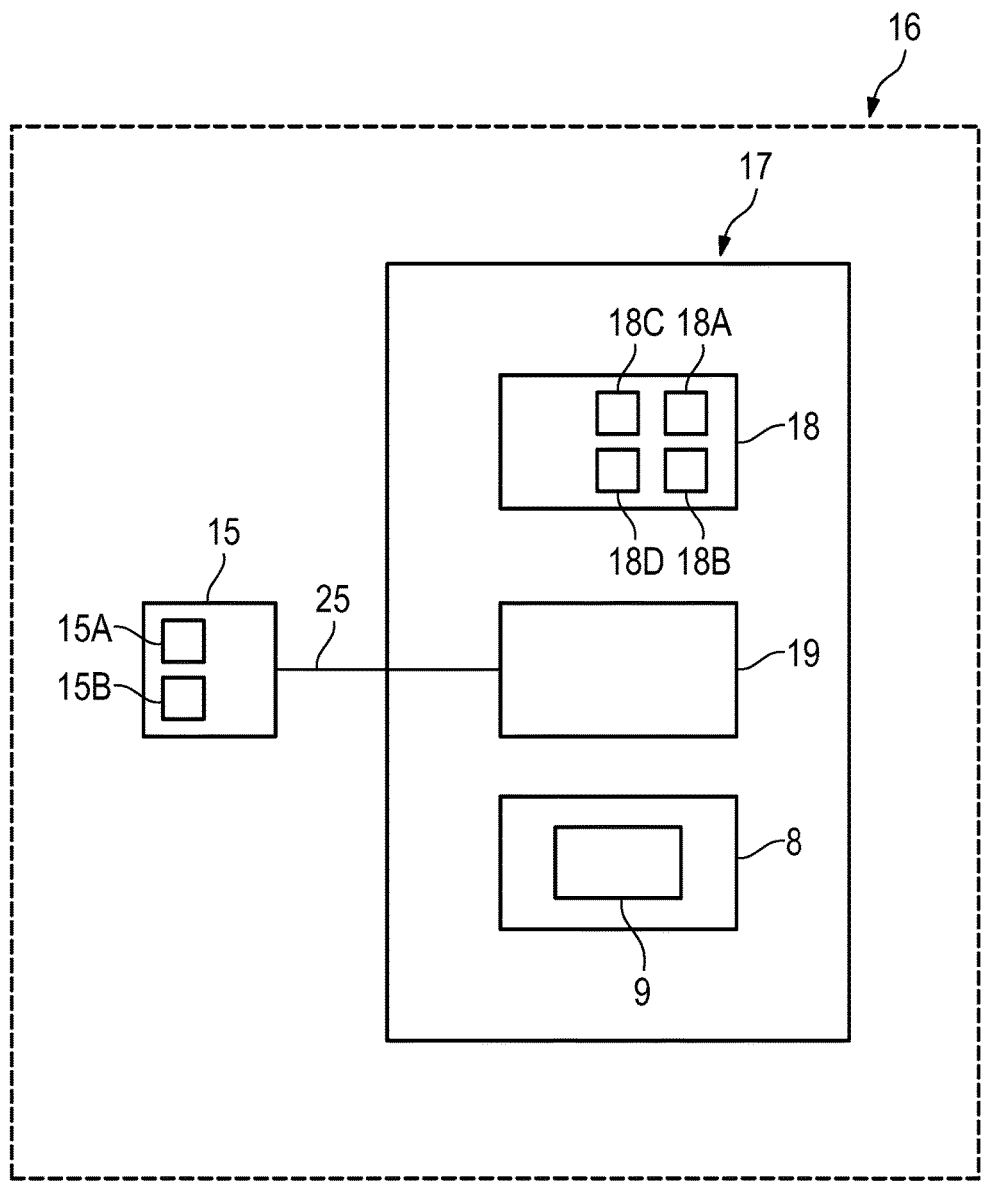
FIG. 3 is a simplified schematic view of the components of the image display device of the construction machine.

FIG. 3 is a simplified schematic view of the components of the construction machine. The construction machine has a position detection device 15 for detecting the pivoting position of the transport device 10 in the horizontal plane, which device can be a component of a central control and computing unit 16 of the construction machine. The horizontal pivoting position of the transport device 10 can be detected using suitable sensors, for example angle transmitters, distance sensors etc., or can be determined from data obtained from the drive means, not shown, for pivoting the transport device, for example from the lifting position of the piston/cylinder arrangements.

The position detection device 15 has a computing unit 15B receiving the data from the sensor 15A, which computing unit is configured in such a way that the angle in the horizontal plane between the longitudinal axis of the transport device 10 and the longitudinal axis of the machine frame 2 is determined from data, for example from the angle transmitter 15A (pivoting position). The position detection device 15 can also detect the angle in the vertical plane between the longitudinal axis of the transport device 10 and the longitudinal axis of the machine frame 2 (height).

Moreover, the construction machine has an image display device 17 for displaying a bird's eye view image of the surroundings of the construction machine, which image display device has a camera system 18 and an image processing system 19. The image is displayed on the display 9A of the display unit 9 on the control stand 7 in the field of vision of the machine operator.

Figure 4:
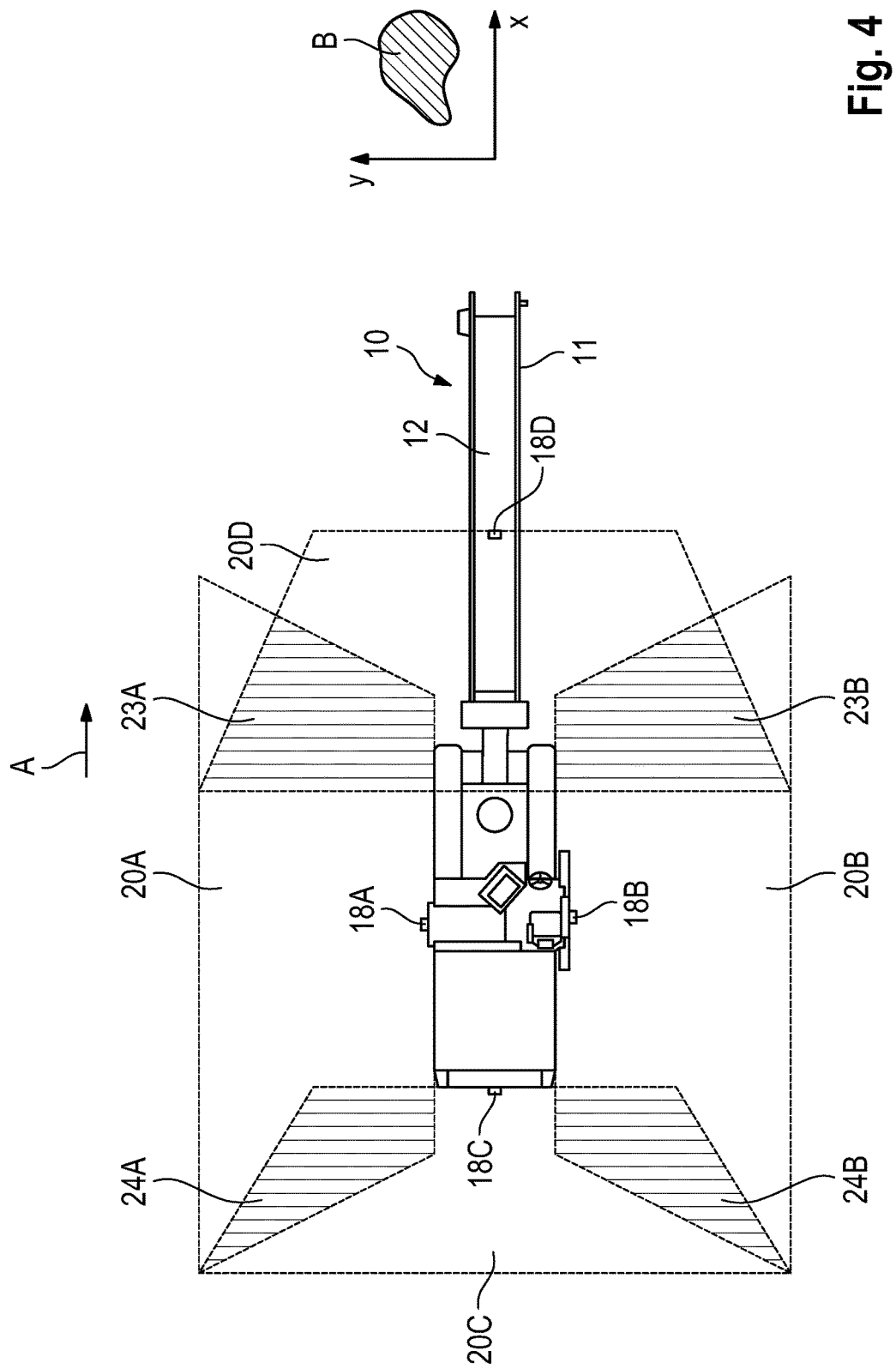
FIG. 4 shows an embodiment of the construction machine with a camera arranged on the transport device, the camera axis of which runs in the longitudinal direction of the transport device, the longitudinal axis of the transport device being located on the longitudinal axis of the machine frame.
Figure 5:
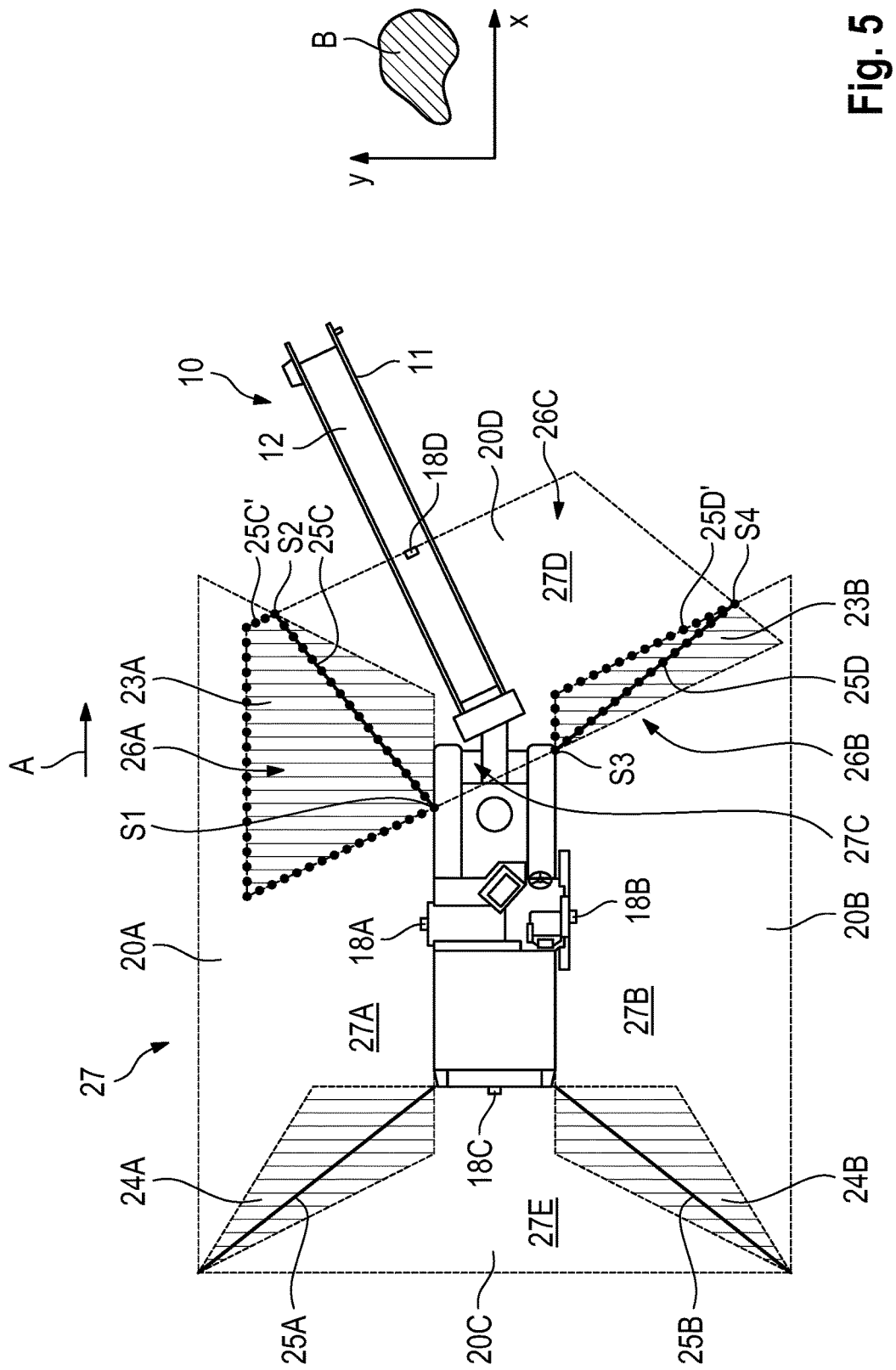
FIG. 5 shows the construction machine of FIG. 4, wherein the transport device is pivoted to one side of the machine frame.
Figure 8:
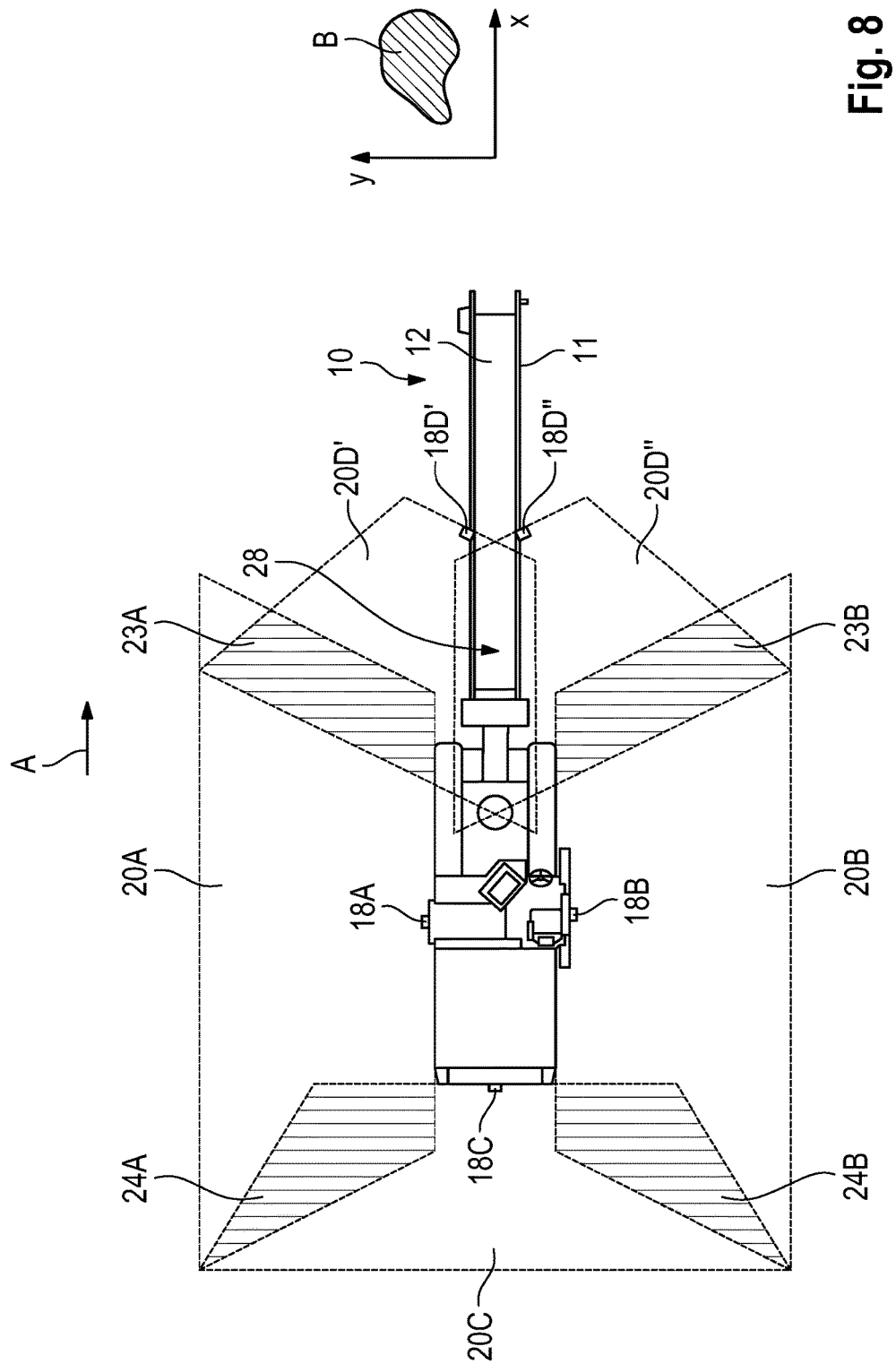
FIG. 8 shows an embodiment of the construction machine with two cameras arranged on the transport device, the camera axes of which are located in a sloping manner with respect to the longitudinal axis of the transport device, the longitudinal axis of the transport device being located on the longitudinal axis of the machine frame.
Figure 9:
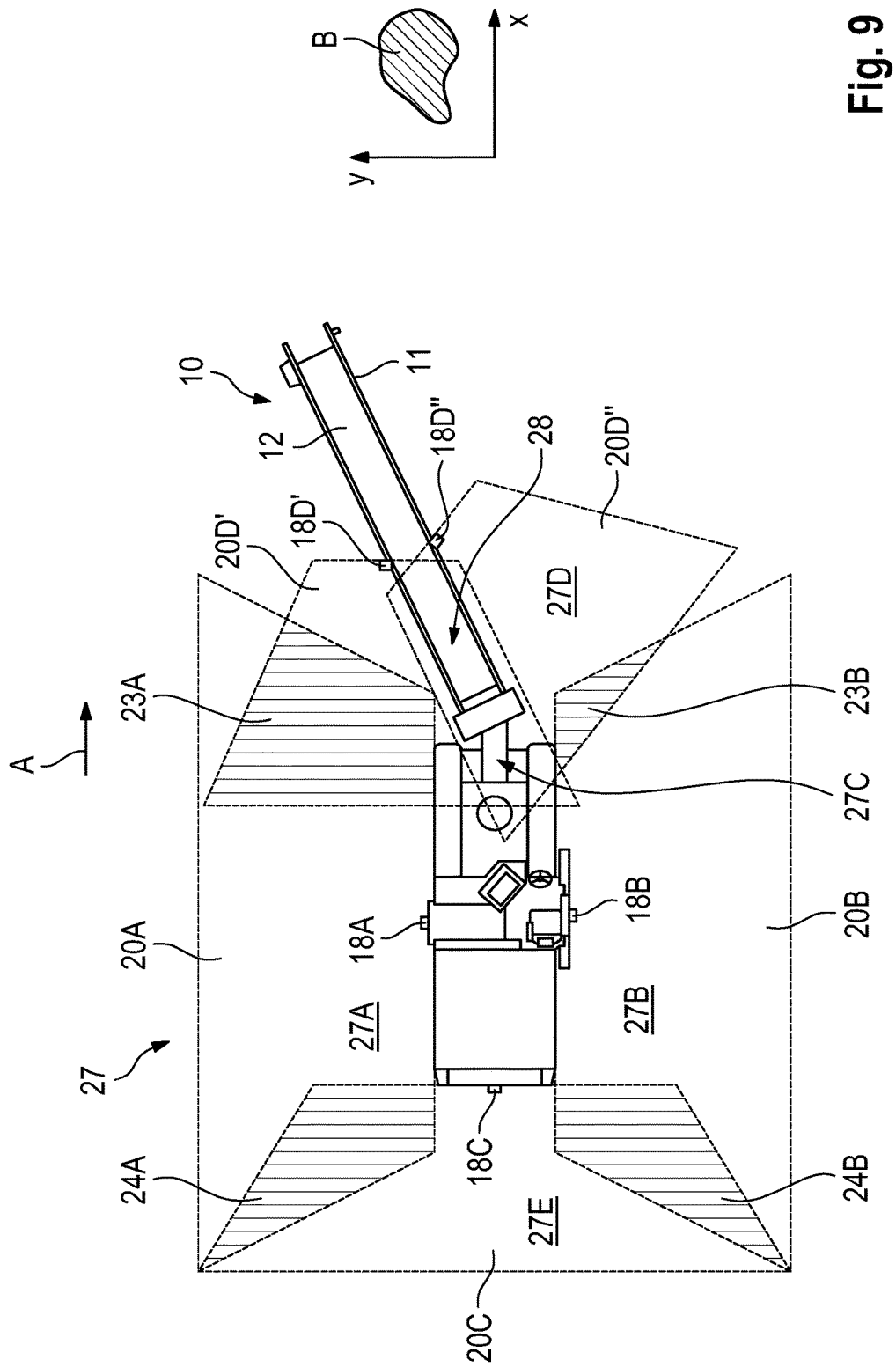
FIG. 9 shows the construction machine of FIG. 8, wherein the transport device is pivoted to one side of the machine frame.

The structure and function of the image display device 17 will be described in detail below. FIGS. 4 and 5 show a first embodiment and FIGS. 8 and 9 show a second embodiment of the construction machine, which only differ from one another with respect to the number of cameras in the camera system.

The image display device 17 of the construction machine has a camera system 18 with a plurality of cameras 18A, 18B, 18C, 18D in the first embodiment or 18A, 18B, 18C, 18D', 18D" in the second embodiment for recording individual image regions of the surroundings of the construction machine from different image recording positions. The cameras in each case record a specific image region of the ground surface B. The position and size of the image region recorded by the camera depend on the arrangement and orientation of the camera and the camera lens system, in particular the focal length of the lens of the camera. The cameras are arranged and configured in such a way that the image regions recorded by the cameras overlap.

In the present embodiments, a lateral left-hand camera 18A is preferably located centrally between the left-hand front and rear corner regions of the machine frame 2, a lateral right-hand camera 18B is preferably located centrally between the right-hand front and rear corner regions of the machine frame 2, and a rear camera 18C is preferably located centrally between the rear corner regions of the machine frame. No cameras are located at the front corner regions of the machine frame.

It is assumed that each camera 18A,B,C would record a substantially rectangular image detail of the ground surface B if the viewing direction of the camera (camera axis) was orthogonal to the ground surface. Because of the setting angle, a trapezoidal image region of the ground surface is recorded by the camera, however, i.e. the region of the site located outside the trapezoidal region is not detected by the camera.

Figure 6:
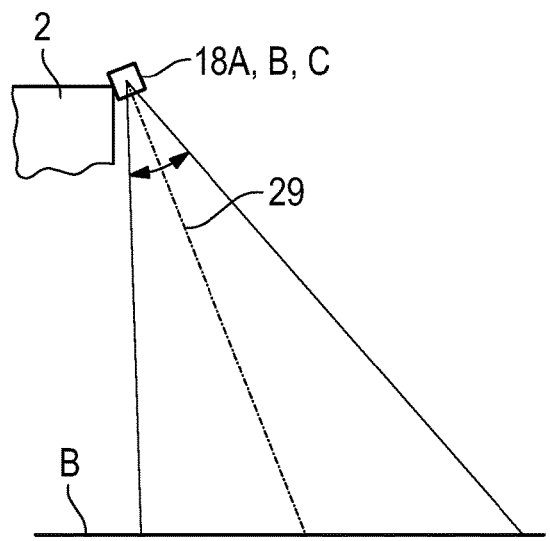
FIG. 6 shows the viewing angle of a camera arranged on the machine frame.

The cameras 18A,B,C are arranged on the machine frame 2 in such a way that the viewing directions 29 of the cameras are directed away from the machine frame 2. The camera axes 29 (viewing directions) of the lateral cameras 18A and 18B and of the rear camera 18C are preferably orthogonal to the longitudinal sides or the narrow side of the machine frame 2, the lateral cameras 18A, B recording a trapezoidal lateral image region 20A, 20B and the rear camera 18C recording a trapezoidal rear image region 20C. The camera axes 29 may, however, also be directed forward or rearward in order to detect a larger front or rear site region. The image regions can then, however, not be described by isosceles trapeziums when there is a parallel orientation of the machine frame to the ground surface B. FIG. 6 shows the viewing direction (camera axis 29) of a camera 18A,B,C on the machine frame 2, which is directed away from the machine frame 2.

Instead of two cameras at the front corner regions of the machine frame, the camera system 18 of the first embodiment has a front camera 18D, which is arranged on the lower side of the jib 11 of the transport device 10. The camera 18D is fastened to a point on the longitudinal axis of the jib 11, which is located in a region of the central third between the two ends of the jib. The fastening point may, however, also be located in the region of the front or rear third of the jib. However, the fastening point should not be located in the region of the free end of the jib, as the free end of the jib is temporarily located over the loading area of the transport vehicle during operation of the construction machine. If the camera is fastened to the free end of the jib, a temporarily limited view is only to be expected, however, during the loading process but not while the construction machine is being moved.

Figure 7:
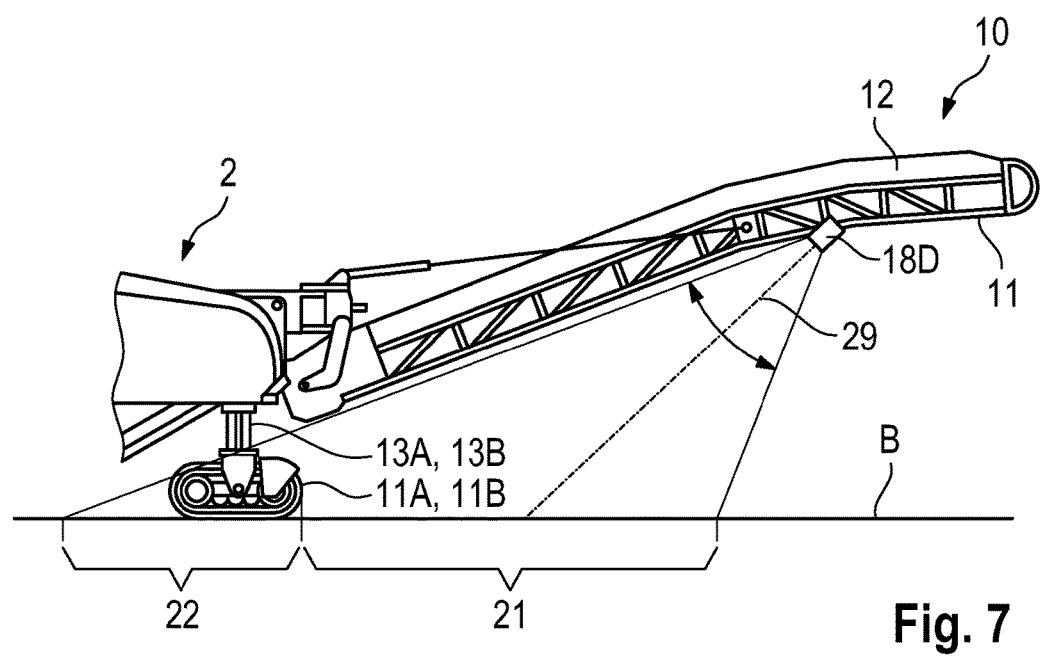
FIG. 7 shows the viewing angle of a camera arranged on the transport device.

The front camera 18D is arranged on the lower side of the transport device 10 in such a way that the camera axis is located on the longitudinal axis of the transport device and that the viewing direction of the camera is directed in the direction of the machine frame 2. The front camera 18D is therefore a camera viewing rearward. FIG. 7 shows the viewing direction (camera axis 29) of the camera 18D on the transport device 10, which is directed in the direction of the machine frame 2.

The angle between the camera axis 29 of the front camera 18D and the plane of the machine frame 2 is preferably such that the camera records a front image region in the working direction, which extends into a portion below the machine frame 2 (FIG. 7). The front camera 18D thus records a site portion 21, which could be detected completely from a bird's eye view if this region were not covered by the transport device 10, and a portion 22, which cannot be detected from the view from an observation point located above the machine frame 2. As the transport device 10 is height-adjustable, the angle between the camera axis 29 and the plane of the machine frame 2 also changes. The setting angle of the front camera 18D is therefore such that in a predetermined position of the transport device 10, which corresponds to the usual operating position, the two image portions 21, 22 include the desired areas (FIG. 7).

FIG. 4 shows the construction machine, the longitudinal axis of the transport device 10 being located on the longitudinal axis of the machine frame 2, while FIG. 5 shows the construction machine, the transport device 10 being pivoted into the operating position, for example to the left-hand side. FIGS. 4 and 5 show that with the pivoting position of the transport device, the position of the image region 20D recorded by the front camera 18D also changes.

The image region 20D of the front camera 18D overlaps with the image region 20A of the lateral left-hand camera 18A and the image region 20B of the lateral right-hand camera 18B, and the image region 20A of the left-hand camera 18A and the image region 20B of the right-hand camera 18B overlap with the image region 20C of the rear camera 18C. A front left-hand overlapping region 23A of the image regions 20A, 20D of the left-hand camera 18A and the front camera 18D and a front right-hand overlapping region 23B of the image regions 20B, 20D of the right-hand camera 18D and the front camera 18D are produced. Furthermore, a rear left-hand overlapping region 24A of the image regions 20A, 20C of the left-hand camera 18A and of the rear camera 18C and a rear right-hand overlapping region 24B of the image regions 20B, 20C of the right-hand camera 18B and of the rear camera 18C are produced.

The image processing system 19 is preferably a data processing unit (CPU), on which a data processing program (software) runs. The position detection device 15 is connected to the image processing system 19 by a data line 25, so that the image processing system 19 can receive the position data of the position detection device.

It is assumed for simplification that the machine frame 2 is located in an orientation parallel to the surface of the ground or that the incline of the machine frame in relation to the site surface is negligible.

The image processing system 19 determines, depending on the pivoting position of the transport device 10, the position of the contours, shown by dotted lines, of the image region 20D of the front camera 18D, the position of which changes upon a pivoting movement of the transport device. Moreover, the image processing system 19 determines the position of the contours, shown by dotted lines, of the image regions 20A, 20B, 20C of the left-hand and right-hand camera 18A, 18B and of the rear camera 18C. The position of the straight contours can be described in a Cartesian X/Y coordinate system, which is located on the surface of the ground B, by the starting and end points thereof. The coordinates of these points are calculated in the image processing system 19 according to an algorithm, which takes into account the pivoting position of the transport device.

Once the position of the image regions 20A, B,C,D, which are described by the coordinates of the starting and end points of the contours, is known, the image processing system 19 determines the position of the overlapping regions 23A, 23B, 24A, 24B of the mutually adjoining image regions 20A,B,C,D. The overlapping regions 23A, 23B, 24A, 24B may, for example, be determined by calculating an intersection of adjacent image regions 20A,B,C,D.

The image processing system 19 is configured in such a way that image details are determined in the individual image regions 20A, 20B, i.e. suitable details from the recorded image regions 20A,B,C,D of the ground surface B, which can be completely joined together to form a total image 27 from a bird's eye view. When joining together the image details, stitching is produced, i.e. boundary lines between the image details or intersecting lines of the image regions. The course of the stitching depends on the position of the overlapping trapezoidal image details.

The image processing system, in the X/Y coordinate system, determines the coordinates of the starting and end points of the contours of the front left-hand overlapping region 23A, the front right-hand overlapping region 23B, the rear left-hand overlapping region 24A and the rear right-hand overlapping region 24B. The overlapping regions are shown by hatched areas in FIGS. 4 and 5. The image processing system 19 thereupon determines the course of the stitching, the following criteria being taken into account.

The course of the rear stitching in the working direction is determined by the image processing system 19 in such a way that the stitching between the left-hand and right-hand image regions 20A, 20B and the rear image region 20C runs within the rear left-hand and right-hand overlapping regions 24A, 24B. The image processing system 19 determines the course of the stitching in such a way that the stitching stretches from the rear, left-hand and right-hand corner points of the machine frame 2 up to the intersection points of the contours of the adjacent image regions 20A, 20C or 20B, 20C. A rear left-hand stitching 25A and a rear right-hand stitching 25B are produced, which are shown in FIG. 5.

For the front image region 20D and the left-hand and right-hand image regions 20A, 20B, the image processing system 19, depending on the pivoting position of the transport device 20, determines a front left-hand stitching 25C running within the front left-hand overlapping region 23A and a front right-hand stitching 25D running within the front right-hand overlapping region 23B.

The front left-hand stitching 25C extends between the intersection points $S_1$ and $S_2$ of the contours of the front image region 20D and of the left-hand image region 20A, and the front right-hand stitching 25D extends between the intersection points $S_3$ and $S_4$ of the contours of the front image region 20D and of the right-hand image region 20B. Located between the two stitchings 25C and 25D is the image detail 26C of the front image region 20D, which is joined together with the associated image details 26A and 26B of the left-hand and right-hand image regions 20A, 20B. For this purpose, the outer portions of the front image region 20D are cut off along the stitching 25C and 25D and the inner portions of the left-hand and right-hand image regions 20A, 20B are cut off along the stitching 25C and 25D.

The position of the starting and end points of the stitching are determined in the X/Y coordinate system by coordinates of the starting and end points of the stitching.

The image processing system 19 produces a total image 27 in a bird's eye view by joining together all the image details. It is shown that the total image 27 comprises a portion 27A located on the left-hand longitudinal side of the machine frame 2 and a portion 27B located on the right-hand longitudinal side of the machine frame 2. Moreover, the total image 27 comprises a portion 27C located below the machine frame 2, a portion 20D located in front of the machine frame 2 and a portion 20E located behind the machine frame 2.

The stitching for the front image region 20D and the left-hand and right-hand image regions 20A, 20B can also be determined in such a way that individual stitching or all the stitching does not run within the contours or overlapping regions but along them. For example, instead of the left-hand front stitching 25C within the overlapping region 25C, a stitching 25C' running between the intersection points $S_1$ and $S_2$ along the outer contour of the front image region 20D can be determined. For example, instead of the right-hand front stitching 25D within the overlapping region 25D, a stitching 25D' running between the intersection points $S_3$ and $S_4$ along the outer contour of the right-hand image region 20B can be determined, for example. It is also possible to determine the stitching for the rear image region and the left-hand and right-hand image regions taking into account other criteria.

FIGS. 8 and 9 show an alternative embodiment, which differs from the embodiment described with reference to FIGS. 4 and 5 in that the camera system 18 has two front cameras 18D' and 18D", which are arranged on the transport device 10. The mutually corresponding parts are therefore provided with the same reference numerals. The left-hand front camera 18D' is fastened to the lower side of the left-hand longitudinal side and the right-hand front camera 18D" is fastened to the lower side of the right-hand longitudinal side of the jib 11 in such a way that the viewing direction of the left-hand camera 18D' is directed in the direction of the left-hand side and the viewing direction of the right-hand camera 18D" is directed in the direction of the right-hand side of the machine frame 2 when the longitudinal axis of the transport device 10 is on the longitudinal axis of the machine frame 2 (FIG. 8). The two cameras 18D', 18D" are fastened to a portion of the jib 11, which is located in the central third of the jib. The image regions 20D' and 20D" of the front left-hand and right-hand cameras 18D', 18D" overlap in a front central overlapping region 28. As in the embodiment with only one camera, the image processing system 19 determines the contours of the front left-hand overlapping region 23A, of the front right-hand overlapping region 23B, of the rear left-hand overlapping region 24A and of the rear right-hand overlapping region 24B. Moreover, the image processing system 19 determines the contours of the front central overlapping region 28. Thereupon, as in the embodiment with only one camera, the rear left-hand and right-hand stitching 24A, 24B is determined. The stitching for the front image regions 20D' and 20D" of the two cameras 18D', 18D" and the left-hand and right-hand image regions 20A, 20B are determined according to the same criteria in such a way that the individual image regions can be joined together to form a complete total image.

The image processing system 19 can determine the course of the stitching and therefore the position and size of the image details, which are joined together to form the total image, in such a way that as large a region as possible of the surroundings is captured completely with all the cameras. For example, the view forward can be extended at the cost of the view rearward or vice versa. However, the view to the left-hand side can also be extended at the cost of the view to the right-hand side or vice versa.

The total image can then be displayed in full size on the display 9 of the display unit 8. However, it is also possible to display only one detail of the total image, for example a rectangular image detail.

The invention claimed is:

1. An automotive construction machine, comprising:
a machine frame having a working direction;
front and rear running gears supporting the machine frame;
a working tool arranged on the machine frame and substantially between the front and rear running gears for removing ground material;
a transport conveyor extending forward or rearward beyond the machine frame to convey removed ground material;
a camera system configured to record image details of overlapping individual image regions of surroundings of the construction machine, the camera system including:
at least one camera arranged on the transport conveyor such that a viewing direction of the camera is directed substantially toward the machine frame; and
at least one additional camera arranged on the machine frame such that a viewing direction of the additional camera is directed substantially away from the machine frame;
an image processing system configured such that the image details of the overlapping individual image regions are joined together to form a total image from a bird's eye view; and
a display unit configured to display the total image.

2. The construction machine of claim 1, wherein:
the at least one camera arranged on the transport conveyor is arranged such that at least a part of the individual image region recorded by the at least one camera arranged on the transport conveyor is located below the machine frame.

3. The construction machine of claim 2, wherein:
the at least one camera arranged on the transport conveyor is arranged such that the part of the individual image region located below the machine frame is also located in a region of at least one front running gear.

4. The construction machine of claim 1, wherein:
the transport conveyor further includes a jib having a lower side, and a conveyor belt arranged on the jib, and the at least one camera arranged on the transport conveyor is arranged on the lower side of the jib.

5. The construction machine of claim 4, wherein:
the jib extends in a longitudinal direction; and
the at least one camera arranged on the lower side of the jib has a camera axis extending substantially in the longitudinal direction of the jib.

6. The construction machine of claim 4, wherein:
the machine frame has first and second opposite sides and a frame longitudinal axis;
the jib has a jib longitudinal axis; and the at least one camera arranged on the transport conveyor includes two cameras arranged on the lower side of the jib, the two cameras being directed at angles to the jib longitudinal axis such that when the jib longitudinal axis is parallel with the frame longitudinal axis one of the two cameras is directed substantially toward the first side of the machine frame and the other of the two cameras is directed substantially toward the second side of the machine frame.

7. The construction machine of claim 1, wherein:
the machine frame has a front side, a rear side, a left side, and a right side; and
the at least one additional camera arranged on the machine frame includes:
 a left-hand camera arranged on the machine frame to record a left-hand image region;
 a right-hand camera arranged on the machine frame to record a right-hand image region; and
 a rear camera arranged on the machine frame to record a rear image region.

8. The construction machine of claim 7, wherein:
the left-hand image region overlaps with an image region recorded by the at least one camera arranged on the transport conveyor; and
the right-hand image region overlaps with an image region recorded by the at least one camera arranged on the transport conveyor.

9. The construction machine of claim 8, wherein:
the image processing system is configured such that the individual image regions recorded by the left-hand camera, the right-hand camera and the at least one camera arranged on the transport conveyor are joined together to form the total image having a left portion located to the left of the machine frame, a right portion located to the right of the machine frame, a lower portion located below the machine frame and a front portion located in front of the machine frame.

10. The construction machine of claim 1, wherein:
the transport conveyor is pivotally arranged on the machine frame to pivot about a pivot axis perpendicular to a plane of the machine frame;
the machine further includes a position detector configured to detect a pivoting position of the transport conveyor relative to the machine frame; and
the image processing system is further configured such that a course of stitching between the overlapping individual image regions is determined depending on the pivoting position of the transport conveyor.

11. The construction machine of claim 10, wherein:
the position detector is configured to produce position data describing the pivoting position; and
the image processing system is further configured such that the course of stitching is located within overlapping portions of the individual image regions.

12. The construction machine of claim 11, wherein:
the image processing system is further configured such that contours of the individual image regions are determined based on the position data, and such that the overlapping portions of the individual image regions are determined based on the contours.

13. A method of displaying an image of the surroundings of an automotive construction machine, the method comprising:
 the construction machine including a machine frame, front and rear running gears supporting the machine frame, a working tool arranged on the machine frame and substantially between the front and rear running gears to remove ground material, and a transport conveyor extending beyond the machine frame to convey removed material;
 recording overlapping individual image regions of the surroundings of the construction machine using a plurality of cameras including at least one camera arranged on the transport conveyor and directed toward the machine frame, and including at least one additional camera arranged on the machine frame and directed away from the machine frame;
 and forming a total image from a bird's eye view by joining together image details of the overlapping individual image regions.

14. The method of claim 13, wherein:
the recording step further comprises recording one of the individual image regions with the at least one camera arranged on the transport conveyor such that a part of the one image region is located below the machine frame.

15. The method of claim 14, wherein:
the recording step further comprises the one image region located below the machine frame also being located in an area of at least one front running gear.

16. The method of claim 14, wherein:
the recording step further comprises the at least one camera arranged on the transport conveyor being arranged on a lower side of the transport conveyor such that a camera axis of the at least one camera arranged on the transport conveyor runs in a longitudinal direction of the transport conveyor.

17. The method of claim 14, wherein:
the recording step further comprises the at least one camera arranged on the transport conveyor including two cameras arranged on a lower side of the transport conveyor and arranged at angles to a longitudinal direction of the transport conveyor such that a viewing direction of one of the two cameras is directed toward one side of the machine frame and a viewing direction of the other of the two cameras is directed towards another side of the machine frame.

18. The method of claim 13, wherein:
the forming step further comprises:
detecting a pivoting position of the transport conveyor relative to the machine frame about an axis running perpendicular to a plane of the machine frame; and
determining a course of stitching between image details of the overlapping individual image regions depending on the pivoting position of the transport conveyor.

19. The method of claim 18, wherein:
the determining step further comprises determining the course of stitching such that the stitching is located within overlapping portions of the overlapping individual image regions.

20. The method of claim 19, wherein:
the determining step further comprises determining contours of the individual image regions and determining the overlapping portions of the overlapping individual image regions based on the contours.

* * * * *